United States Patent Office 2,760,981
Patented Aug. 28, 1956

2,760,981

PREPARATION OF SUBSTITUTED PHENANTHREN-2-ONES

Harold Raffelson, St. Louis, Mo., assignor to Monsanto Chemical Company, St. Louis, Mo., a corporation of Delaware No Drawing. Application February 27, 1953, Serial No. 339,470

6 Claims. (Cl. 260—586)

This invention relates to an improved process for the preparation of 8a-methyl, $\Delta^{6,10a(1)}$-decahydro-phenanthren-2-ones of the structural formula

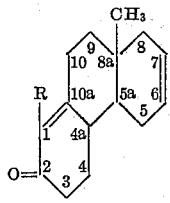

where R is hydrogen or a methyl radical, which compounds are described and claimed in William S. Knowles' co-pending application Serial No. 335,990, filed February 9, 1953.

In accordance with this invention it has been found that 8a-methyl, $\Delta^{6,10a(1)}$-decahydrophenanthren-2-ones of the aforedescribed structural formula may be prepared in quantitative or substantially quantitative yields by reacting in a fluid medium comprising an aliphatic alcoholate of an alkali metal an 8a-methyl, $\Delta^{6,9,10a(1)}$-octahydrophenanthren-2-one of the structural formula

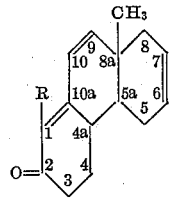

where R is hydrogen or a methyl radical, with one molar equivalent of hydrogen in the presence of palladium.

It will be obvious to those skilled in the art that the reactants of the process of this invention contain three asymmetric carbon atoms. As a result thereof, these reactants may exist in eight optically active forms or four racemates, i. e., anti-trans, syn-trans, anti-cis, and syn-cis racemic mixtures of dextro and levo optically active isomers. All such forms of the substituted phenanthren-2-one reactants are contemplated as coming within the scope of this invention. The notations "cis" and "trans" as used in the specification indicate the spacial configuration of the CH₃ group and H at positions 8a and 5a respectively in the structural formula. The notations "syn" and "anti" as used in the specification indicate the spacial configuration of H at position 4a in the structural formula with respect to the 5a H substituent. It is to be understood that where no notation appears with the name of the reactants of the process of this invention, that the name is to be interpreted in its generic sense, that is as representing the individual dextro and levo isomers in separated form as well as the racemic mixtures thereof or isomeric racemic mixtures of same as well as the total unresolved mixture of isomers.

By the expression "a fluid medium comprising an alcoholate of an alkali metal" as used in the specification and claims is meant to include anhydrous solutions of compounds derived from an aliphatic alcohol by replacing the hydroxyl hydrogen with an alkali metal as well as aliphatic alcohol solutions of alkali metal hydroxides. The preferred fluid medium is an aliphatic alcohol solution of an alkali metal hydroxide, such solutions being prepared by dissolving either an alkali metal hydroxide in solid form in the alcohol or by simply mixing the alcohol with an aqueous solution of the alkali metal hydroxide. The preferred alcohols of this invention are the water-miscible alcohols (which for purposes of this invention includes the partially or slightly water-miscible alcohols) such as methanol, ethanol, propanol, isopropanol, butanol, isobutanol, isoamyl alcohol, hexyl alcohol, cyclohexanol, the lower alkoxy substituted aliphatic alcohols such as 2-methoxy ethanol, 2-ethoxy ethanol, 2-butoxy ethanol, and the like.

In the process of this invention palladium is the hydrogenation catalyst and such is employed in any amount sufficient to catalyze the reaction. Although metallic palladium per se is operable, it is preferred that palladium be distributed on a suitable carrier such as activated carbon, alumina, diatomaceous earth, silica, barium sulfate, strontium carbonate, calcium carbonate, magnesium carbonate, and the like, and suspended in the reaction medium. Such catalytic masses are prepared by well known methods, as for example an aqueous solution of a palladium salt is uniformly distributed on a suitable carrier, the mass being then dried, then heated to break down the palladium salt and subsequently heated to reduce the residue to the desired metal oxide, which oxide is then subjected to the expected reaction temperature range in an atmosphere of hydrogen.

As illustrative of the process of this invention is the following:

Example I

Approximately 20 parts by weight (substantially 0.087 mols) of 1,8a-dimethyl-$\Delta^{6,9,10a(1)}$-octahydrophenanthren-2-one is admixed in a suitable reaction vessel with approximately 100 parts by weight of sec. butyl alcohol, approximately 16 parts by weight of 2.5% solution of sodium sec. butylate in sec. butyl alcohol, and approximately 2.5 parts by weight of a 10% palladium charcoal catalyst (prepared by reducing palladium chloride in an alkaline suspension of activated carbon). While agitating, gaseous hydrogen is passed into the mixture at 25–30° C. After absorption of substantially one molar equivalent of hydrogen, the catalyst is removed by filtration. The catalyst is washed with hot sec. butyl alcohol and the washings and original filtrate combined, which combination is then neutralized with dilute hydrochloric acid and then subjected to vacuum distillation. The residue is then washed with several small portions of water. The layers are separated and upon subjecting the organic residue to vacuum distillation a yield in excess of 95% of a product believed to be 1,8a-dimethyl-$\Delta^{6,10a(1)}$-decahydrophenanthren-2-one is obtained.

Example II

Approximately 10 parts by weight of dl-anti-trans-1,8a-dimethyl-$\Delta^{6,9,10a(1)}$-octahydrophenanthren-2-one (M. P. 72–73° C.) is admixed in a suitable reaction vessel with approximately 80 parts by weight of 95% ethanol, approximately 2.0 parts by weight of a 5% aqueous sodium hydroxide solution, and approximately one part by weight of a 2% palladium-strontium carbonate catalyst (which had been previously reduced). While agitating, gaseous hydrogen is passed into the mixture at about 25° C. and at substantially atmospheric pressure. After absorption of substantially one molar equivalent of hydrogen, which takes about 1.2 hours, the catalyst is filtered off and the filtrate is neutralized with dilute sulfuric acid and is then subjected to vacuum distillation. The residue is then taken up with benzene, and is then washed with several small portions of water. The layers are separated and the organic layer is subjected to vacuum distillation. A substantially 100% yield of a colorless oily product identified as dl-anti-trans-1,8a-dimethyl-$\Delta^{6,10a(1)}$-decahydrophenanthren-2-one is obtained.

Example III

Approximately 10 parts by weight of dl-anti-trans-8a-methyl-$\Delta^{6,9,10a(1)}$-octahydrophenanthren-2-one (M. P. 76–80° C.) is admixed in a suitable reaction vessel with approximately 50 parts by weight of pentasol (a mixture of amyl alcohols b. p. 116–136° C.), approximately 1 part by weight of a 10% aqueous potassium hydroxide solution, and one part by weight of a 2% palladium-calcium carbonate catalyst (which had been previously reduced). While agitating, hydrogen is passed into the mixture at about 25° C. and at substantially atmospheric pressure. After absorption of substantially one molar equivalent of hydrogen, the catalyst is removed by filtration. The filtrate is then neutralized with dilute hydrochloric acid and is then subjected to vacuum distillation. The residue is taken up with toluene and washed with several portions of water. The layers are separated and the organic layer subjected to vacuum distillation. A substantially 100% by weight yield of white solid dl-anti-trans-8a-methyl-$\Delta^{6,10a(1)}$-decahydrophenanthren-2-one (M. P. 91–93° C.) is obtained.

Employing identically the same procedure but replacing potassium hydroxide with an equimolecular amount of sodium hydroxide a substantially 100% yield of white solid dl-anti-trans-8a-methyl-$\Delta^{6,10a(1)}$-decahydrophenanthren-2-one is obtained.

Example IV

Approximately 22.8 parts by weight of d-anti-trans-1,8a-dimethyl-$\Delta^{6,9,10a(1)}$-octahydrophenanthren-2-one (M. P. 42–44° C.) is admixed in a suitable reaction vessel with approximately 100 parts by weight of isopropanol, approximately 2.85 parts by weight of a 2% palladium-strontium carbonate catalyst (which had been previously reduced) and approximately 2.3 parts by weight of a 10% sodium hydroxide solution. While agitating, gaseous hydrogen is passed into the mixture at about 25° C. until approximately one molar equivalent of hydrogen is absorbed, which takes about 1.2 hours. The catalyst is filtered off, and the filtrate is neutralized with dilute hydrochloric acid and is subjected to vacuum distillation. The residue is taken up with benzene, washed with water and subjected to vacuum distillation. The substantially colorless oil so obtained is identified as being d-anti-trans-1,8a-dimethyl-$\Delta^{6,10a,(1)}$-decahydrophenanthren-2-one, the yield being substantially 100%.

Employing the same procedure as above (Example IV) but omitting the incorporation in the reaction mix of the aqueous solution of sodium hydroxide a yield of d-anti-trans-1,8a-dimethyl-$\Delta^{6,10a(1)}$-decahydrophenanthren-2-one of about 82% by weight is obtained.

Example V

Approximately 22.8 parts by weight of l-anti-trans-1,8a-dimethyl-$\Delta^{6,9,10a(1)}$-octahydrophenanthren-2-one (M. P. 42–44° C.) is admixed in a suitable reaction vessel with approximately 80 parts by weight of isopropanol, approximately 2.85 parts by weight of a 2% palladium-strontium carbonate catalyst (which had been previously reduced) and approximately 2.3 parts by weight of a 10% potassium hydroxide solution. While agitating, gaseous hydrogen is passed into the mixture at about 25° C. until approximately one molar equivalent of hydrogen is absorbed, which takes about 1.2 hours. The catalyst is filtered off and the filtrate is neutralized with dilute hydrochloric acid and subjected to vacuum distillation. The residue is then washed with several small portions of water and is then subjected to vacuum distillation. The residual substantially colorless oil so obtained is identified as being l-anti-trans-1,8a-dimethyl-$\Delta^{6,10a(1)}$-decahydrophenanthren-2-one, the yield being substantially 100%.

The hydrogenation reaction is usually carried out at atmospheric pressure, however, sub-atmospheric pressures may be employed. Although temperatures in the range of 0° C. to 50° C. are particularly convenient, higher or lower temperatures may be employed. The extent of the hydrogenation may be readily followed by observing the decrease in pressure as the hydrogen is absorbed. The hydrogenation is ordinarily and preferably continued until hydrogen has been absorbed in an amount corresponding to that theoretically required to convert the $\Delta^{6,9,10a(1)}$-octahydrophenanthren-2-one to the $\Delta^{6,10a(1)}$-decahydrophenanthren-2-one.

Although in the foregoing examples of the preferred embodiment of this invention aqueous solutions of alkali metal hydroxide were admixed with the inert alcohol solvent to effect a fluid medium comprising an aliphatic alcoholate of an alkali metal, it is to be understood that greater or lesser concentrated aqueous solutions of alkali metal hydroxide may be employed whether or not the proportions employed produce a continuous liquid phase. It is preferred, however, that the proportions of the aliphatic alcohol and aqueous alkali metal hydroxide solution employed be miscible proportions. Ordinarily the amount of alkali metal calculated as alkali metal hydroxide used in the process of this invention will be from about 0.05 to 10 per 100 parts by weight of the substituted phenanthren-2-one reactant.

While the invention has been described with respect to certain specific embodiments it is not so limited and it is to be understood that variations and modifications thereof, e. g. other conventional procedures in neutralizing the reaction mix and recovering the hydrogenated product which are obvious to those skilled in the art may be made without departing from the spirit or scope of this invention.

What is claimed is:

1. In the process of making an 8a-methyl, $\Delta^{6,10a(1)}$-decahydrophenanthren-2-one of the structural formula

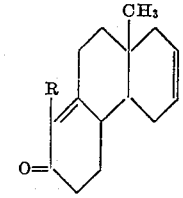

where R is a member of the group selected from hydrogen and a methyl radical, the step which comprises reacting in a fluid medium comprising an alcoholate of an alkali metal an 8a-methyl, $\Delta^{6,9,10a(1)}$-octahydrophenanthren-2-one of the structural formula

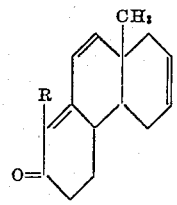

where R is a member of the group consisting of hydrogen and a methyl radical, with one molar equivalent of hydrogen in the presence of palladium.

2. The process of making 1,8a-dimethyl, $\Delta^{6,10a(1)}$-decahydrophenanthren-2-one which comprises reacting in an aliphatic alcoholic solution of sodium hydroxide 1,8-dimethyl, $\Delta^{6,9,10a(1)}$-octahydrophenanthren-2-one with one molar equivalent of hydrogen in the presence of palladium.

3. The process of making dl-anti-trans-1,8a-dimethyl, $\Delta^{6,10a(1)}$-decahydrophenanthrene-2-one which comprises reacting in an aliphatic alcoholic solution of sodium hydroxide dl-anti-trans-1,8a-dimethyl, $\Delta^{6,9,10a(1)}$-octahydrophenanthren-2-one with one molar equivalent of hydrogen in the presence of palladium.

4. The process of making $d$-anti-trans-1,8a-dimethyl, $\Delta^{6,10a(1)}$-decahydrophenanthrene-2-one which comprises reacting in an isopropanol solution of sodium hydroxide $d$-anti-trans-1,8a-dimethyl, $\Delta^{6,9,10a(1)}$ - octahydrophenanthren-2-one with one molar equivalent of hydrogen in the presence of palladium.

5. The process of making $l$-anti-trans-1,8a-dimethyl, $\Delta^{6,10a(1)}$-decahydrophenanthrene-2-one which comprises reacting in an isopropanol solution of sodium hydroxide $l$-anti-trans-1,8a-dimethyl, $\Delta^{6,9,10a(1)}$ - octahydrophenanthren-2-one with one molar equivalent of hydrogen in the presence of palladium.

6. The process of making $dl$-anti-trans-8a-methyl, $\Delta^{6,10a(1)}$-decahydrophenanthrene-2-one which comprises reacting in an aliphatic alcoholic solution of sodium hydroxide $dl$-anti-trans-8a-methyl, $\Delta^{6,9,10a(1)}$-octahydrophenanthren-2-one with one molar equivalent of hydrogen in the presence of palladium.

References Cited in the file of this patent

Berkman et al.: "Catalysis," 1940, Reinhold Publ. Corp., 330 W. 42d Street, New York, pp. 814 and 843.

Fieser et al.: Organic Chemistry, Heath & Co., 1944, pp. 785–786.

Woodward et al.: "Jour. Am. Chem. Soc.," vol. 74, 1952, pp. 4227–4228.